US008746272B2

(12) United States Patent
Smith et al.

(10) Patent No.: US 8,746,272 B2
(45) Date of Patent: *Jun. 10, 2014

(54) SOLENOID BYPASS SYSTEM FOR CONTINUOUS OPERATION OF PNEUMATIC VALVE

(75) Inventors: Anthony John Smith, New Tripoli, PA (US); Jeffery C. Barthold, Walnutport, PA (US); William John Dax, Orefield, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 270 days.

This patent is subject to a terminal disclaimer.

(21) Appl. No.: 13/352,643

(22) Filed: Jan. 18, 2012

(65) Prior Publication Data

US 2013/0075636 A1 Mar. 28, 2013

Related U.S. Application Data

(63) Continuation-in-part of application No. 13/245,280, filed on Sep. 26, 2011, now Pat. No. 8,528,581.

(51) Int. Cl.
*F16L 31/02* (2006.01)

(52) U.S. Cl.
USPC ............................ 137/240; 137/602; 137/884

(58) Field of Classification Search
USPC .......... 137/884, 602, 1, 238, 240; 251/129.15
See application file for complete search history.

(56) References Cited

U.S. PATENT DOCUMENTS

| | | | | |
|---|---|---|---|---|
| 3,411,272 | A | 11/1968 | Carmon | |
| 3,776,275 | A | 12/1973 | Updike | |
| 4,017,384 | A | 4/1977 | Freeman et al. | |
| 4,911,201 | A | 3/1990 | Nichols et al. | |
| 5,665,898 | A | 9/1997 | Smith et al. | |
| 6,155,282 | A | 12/2000 | Zachary et al. | |
| 6,179,096 | B1 | 1/2001 | Kinerson et al. | |
| 6,186,167 | B1 | 2/2001 | Grumstrup et al. | |
| 6,722,383 | B2 | 4/2004 | Summers et al. | |
| 6,807,981 | B2 | 10/2004 | Miyazoe et al. | |
| 6,920,409 | B2 | 7/2005 | Essam | |
| 7,556,238 | B2 | 7/2009 | Seberger | |
| 7,669,594 | B2 | 3/2010 | Downie | |
| 8,015,991 | B2 * | 9/2011 | Kaitsuka | 137/884 |
| 8,061,379 | B2 * | 11/2011 | Inaba et al. | 137/884 |

FOREIGN PATENT DOCUMENTS

| | | |
|---|---|---|
| DE | 102008020049 A1 | 10/2009 |
| JP | 63118480 | 7/1988 |
| JP | 02286980 | 11/1990 |

(Continued)

*Primary Examiner* — Kevin Lee

(74) *Attorney, Agent, or Firm* — Anne B. Kiernan; Joseph D. Rossi

(57) ABSTRACT

A solenoid valve assembly capable of providing a continuous flow of pressurized inert gas to operate a process tool without interruption. A system comprising the solenoid valve assembly is also provided. The valve assembly comprises a manifold that is internally fluidly connected to each of the internal pressure ports, the internal actuator port, and the internal relief port of each solenoid valve, and wherein the manifold comprises a dedicated external relief port for each of the solenoid valves, wherein the dedicated external relief port is in fluid communication with the internal relief port of the respective solenoid valve such that, when one of the solenoid valves is de-energized, a second source of pressurized inert gas can be connected to the external relief port and supply pressure to the respective pneumatic valve operated by that solenoid valve. The system allows a controller to be capable of being removed away from the system such that a panel comprising the valve assembly remains on the fluid system.

14 Claims, 6 Drawing Sheets

(56) References Cited

FOREIGN PATENT DOCUMENTS

| | | |
|---|---|---|
| JP | 05022803 | 3/1993 |
| JP | 05047645 | 6/1993 |
| JP | 06281037 | 10/1994 |
| JP | 07317939 | 12/1995 |
| JP | 11024756 | 1/1999 |
| JP | 2003056732 | 2/2003 |
| JP | 2011089566 | 5/2011 |

* cited by examiner

SOLENOID BYPASS SYSTEM FOR CONTINUOUS OPERATION OF PNEUMATIC VALVE

CROSS-REFERENCE TO RELATED APPLICATIONS

This patent application is a continuation-in-part of U.S. patent application Ser. No. 13/245,280, filed on Sep. 26, 2011, now U.S. Pat. No. 8,528,581, which is incorporated herein by reference in its entirety.

BACKGROUND OF THE INVENTION

The present invention relates generally to solenoid-operated valve devices for controlling industrial process systems, and more particularly to a system that allows for a continuous flow of industrial process gas through a valve while the electronic controller operating the valve not only is experiencing down time but is physically removed from the valve.

Modern process or manufacturing plants contain innumerable operating components. These components are tied together to form systems controlled by instrumentation and control systems containing sensors and controllers. The instrumentation and control systems in such plants not only serve to control the functions of the various components in order to achieve the desired process conditions, but they also provide the facility to safely modify or discontinue the operation of all or a portion of the plant's systems in order to avoid an unsafe situation or condition.

For example, in a semiconductor manufacturing plant, gases/chemicals are handled by gas delivery equipment consisting of numerous valves and pressure sensors, with each delivery system controlled by a dedicated process control system (controller). The process delivery equipment supplies gas/chemical to a process tool where wafer fabrication is conducted through pneumatically operated valves. Such valves are operated by pneumatic actuators connected through solenoid operated pilot valves to the pneumatic control source.

In operation, the solenoid-operated valves of such systems serve to initiate a process whereby a fluid or pneumatic supply is either applied to or vented from the process valve actuator when one or more operatively associated solenoid-operated valves changes state or position in a predetermined manner, e.g., when the solenoid-operated valve is de-energized by the controller.

It takes a variety of different process tools and many processes steps involving the delivery of a variety of gases to ultimately create a semiconductor device layer-by-layer on a silicon wafer. As this process can take several days or weeks, depending on the complexity of the semiconductor device, the process tools preferably operate 24/7. This requires the gas delivery equipment supporting the process tools to supply a constant, uninterrupted flow of gas or chemical. An unscheduled interruption of a gas/chemical at the tool could result in a failed process step which may render useless the silicon wafers in-process at the time. The monetary value of this loss of silicon wafers can be significant, often listed in millions of dollars of lost revenue.

Thus, there exists a need for an apparatus and method to ensure a continuous flow of pressurized gas to the pneumatic valves in manufacturing processes when the controlling solenoid valves are de-energized for any reason, including failure and maintenance.

BRIEF SUMMARY OF THE INVENTION

The present invention satisfies this need by providing a solenoid assembly for operating a plurality of pneumatic valves of a fluid delivery system and capable of supplying an uninterrupted flow of a fluid, the assembly comprising: a first means to supply a pressurized inert gas; a plurality of solenoid valves, wherein each solenoid valve is capable of being in an energized state and a de-energized state, each solenoid valve comprising: an internal pressure port in fluid communication with the first means to supply a pressurized inert gas; an internal actuator port in fluid communication with a respective pneumatic valve and with the internal pressure port when the solenoid is in an energized state; and an internal relief port in fluid communication with the internal actuator port when the solenoid valve is in a de-energized state; a manifold upon which the plurality of solenoids is affixed, wherein the manifold is internally fluidly connected to each of the internal pressure inlet, the internal actuator port, and the internal relief port of each solenoid, and wherein the manifold comprises: an external pressure port in fluid communication with each internal pressure port of each solenoid valve; and a dedicated external relief port for each of the plurality of solenoid valves, wherein the dedicated external relief port is in fluid communication with the internal relief port of the respective solenoid valve such that, when one of the solenoid valves is de-energized, a second means to supply a pressurized inert gas can be connected to the external relief port and supply pressure to the respective pneumatic valve operated by that solenoid valve; and a controller means for energizing and de-energizing each of the plurality of solenoids.

In another aspect, the present invention provides a method for continuously operating a pneumatic valve delivering a fluid to a process tool via a solenoid valve assembly, the solenoid valve assembly comprising: a first means to supply a pressurized inert gas; a plurality of solenoid valves, wherein each solenoid valve is capable of being in an energized state and a de-energized state, each solenoid valve comprising: an internal pressure port in fluid communication with the first means to supply a pressurized inert gas; an internal actuator port in fluid communication with a respective pneumatic valve and with the internal pressure port when the solenoid is in an energized state; and an internal relief port in fluid communication with the internal actuator port when the solenoid valve is in a de-energized state; a manifold upon which the plurality of solenoids is affixed, wherein the manifold is internally fluidly connected to each of the internal pressure inlet, the internal actuator port, and the internal relief port of each solenoid, and wherein the manifold comprises: an external pressure port in fluid communication with each internal pressure port of each solenoid valve; and a dedicated external relief port for each of the plurality of solenoid valves, wherein the dedicated external relief port is in fluid communication with the internal relief port of the respective solenoid valve such that, when one of the solenoid valves is de-energized, a second means to supply a pressurized inert gas can be connected to the external relief port and supply pressure to the respective pneumatic valve operated by that solenoid valve; and a controller means for energizing and de-energizing each of the plurality of solenoids, the method comprising the steps of: supplying pressurized inert gas to the at least one external pressure port of the manifold; energizing at least one of the solenoid valves to allow the pressurized inert gas to flow through the internal pressure port of the at least one solenoid valve out through the external actuator port of the at least one solenoid valve to the respective pneumatic valve; connecting a second means to supply a pressurized inert gas to at least one of the dedicated external relief ports of the manifold; supplying the pressurized inert gas to the at least one of the dedicated external relief ports of the manifold; de-energizing the at least one energized solenoid valves to which the second means to supply a pressurized inert gas is connected via the dedicated external relief port; and supplying pressurized inert gas to the respective pneumatic valve operated by the de-energized solenoid valve from the dedicated external relief outlet through the external actuator port.

In yet another aspect, the present invention provides a system for operating a plurality of pneumatic valves of a fluid delivery system and capable of supplying an uninterrupted flow of a fluid, the system comprising: a fluid system enclosure capable of housing at least one fluid delivery apparatus; a controller secured to but removable from the fluid system enclosure; a panel secured to and separable from the controller, the panel comprising: a plurality of solenoid valves, wherein each solenoid valve is capable of being in an energized state and a de-energized state, each solenoid valve comprising: an internal pressure port in fluid communication with a first means to supply a pressurized inert gas; an internal actuator port in fluid communication with a respective pneumatic valve and with the internal pressure port when the solenoid is in an energized state; and an internal relief port in fluid communication with the internal actuator port when the solenoid valve is in a de-energized state; and a manifold upon which the plurality of solenoids is affixed, wherein the manifold is internally fluidly connected to each of the internal pressure inlet, the internal actuator port, and the internal relief port of each solenoid, and wherein the manifold comprises: an external pressure port in fluid communication with each internal pressure port of each solenoid valve; and a dedicated external relief port for each of the plurality of solenoid valves, wherein the dedicated external relief port is in fluid communication with the internal relief port of the respective solenoid valve such that, when one of the solenoid valves is de-energized, a second means to supply a pressurized inert gas can be connected to the external relief port and supply pressure to the respective pneumatic valve operated by that solenoid valve, wherein the controller is capable of being removed away from the fluid system enclosure separate from the panel such that the panel remains on the fluid system enclosure.

Other aspects, features and embodiments of the invention will be more fully apparent from the ensuing disclosure and appended claims.

DETAILED DESCRIPTION OF THE INVENTION

Figure 1:
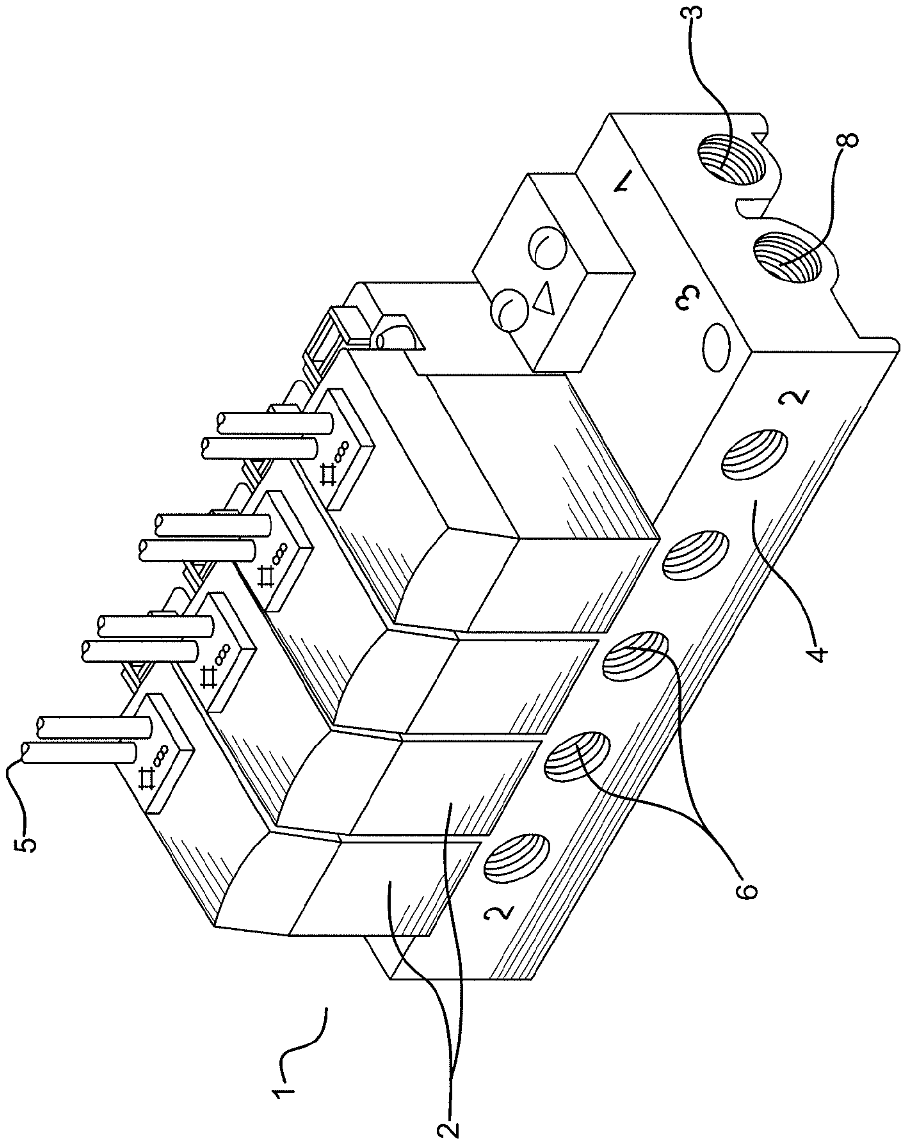
FIG. 1 (Prior Art)
FIG. 1 is a perspective view of a prior art solenoid assembly.

Referring to the figures set forth in the accompanying Drawings, the illustrative embodiments of the present invention will be described in detail herein below. For clarity of exposition, like features shown in the accompanying Drawings shall be indicated with like reference numerals and similar features as shown in alternate embodiments in the Drawings shall be indicated with similar reference numerals.

The present invention relates to a solenoid assembly for operating a plurality of pneumatic valves of a fluid delivery system and capable of supplying an uninterrupted flow of a fluid. As used herein, the term "uninterrupted" or "continuous" as it refers to the operation of an industrial process tool means that the process tool does not experience significant down time or delay that would render the tool inoperable or would cause the failure of the process step employing the tool. As used herein, the term "fluid" means a liquid, a gas, or a gaseous chemical reagent.

FIG. 1 illustrates an example of a typical prior art solenoid assembly 1 for the operation of, for example, a pneumatic valve on an industrial gas handling equipment such as, for example, a gas cabinet delivering a gaseous chemical to a semiconductor process tool. Prior art solenoid assembly 1 is electrically controlled by a dedicated process control system comprising sensors and a microprocessor (not shown) via wires 5. Prior art solenoid assembly 1 comprises multiple solenoid valves 2 secured to manifold 4, which provides internal connections to pneumatic ports (not shown) in each solenoid valve 2. Each of solenoid valves 2 controls a respective pneumatic valve that, in turn, delivers a gas or a gaseous chemical to a process tool. Manifold 4 comprises external actuator ports 6 (one dedicated to each solenoid valve 2) (fittings not shown), external pressure port 3 (fittings not shown), and external relief port 8 (fittings not shown). A pressurized inert gas such as, for example, air or nitrogen, is introduced via external pressure port 3 to supply each of the solenoid valves 2 with pressurized inert gas such that, when energized, each of the solenoid valves 2 will supply the pressurized inert gas to a respective pneumatic valve (not shown) via flexible tubing (not shown) through the external actuator ports 6. Once de-energized, pressurized inert gas is exhausted from the solenoid valves 2 via external relief port 8. External pressure port 3 and external relief port 8 run the length of the manifold 4 and are in fluid communication with each of the solenoid valves 2. In this configuration, if the controller becomes inoperable and needs to be repaired then the entire manifold needs to be shut down and, thus, all of the tools operated by the solenoid valves would be shut down causing an interruption in the manufacturing process and, potentially, a failed process step resulting in the loss of revenue.

Figure 2:
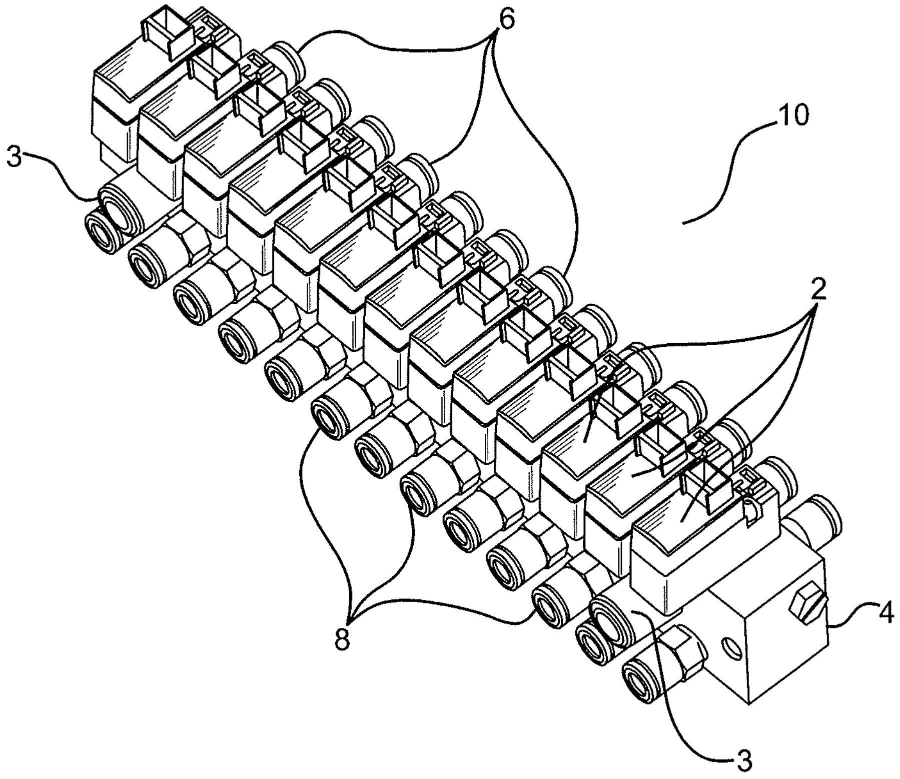
FIG. 2 is a perspective view of one embodiment of the solenoid assembly of the present invention.

FIG. 2 is a perspective view of the solenoid assembly 10 of one embodiment of the present invention. Solenoid assembly 10 comprises a plurality of solenoid valves 2, wherein each solenoid valve 2 is capable of being in an energized state and a de-energized state. Like that of FIG. 1, each of solenoid valves 2 controls a pneumatic valve that, in turn, delivers a gas or a gaseous chemical to an industrial process tool such as, for example, a process tool employed during a step in the manufacturing process of a semiconductor on a silicon wafer. Any solenoid known to those of ordinary skill in the art can be employed in the present invention. One example of a suitable solenoid valve for use in the present invention is a V100 Series three-port solenoid valve commercially available from SMC Corporation of America (Noblesville, Ind.).

Each solenoid valve 2 comprises an internal pressure port (not shown) in fluid communication with a first means to supply a pressurized inert gas (not shown). The first means to supply a pressurized inert gas can be, for example, a pneumatic pressure line connected to, for example, a pressurized cylinder or a house air or $N_2$ line. Each solenoid valve 2 also comprises an internal actuator port (not shown) in fluid communication with a respective pneumatic valve (not shown) and with the internal pressure port when the solenoid is in an energized state. Each solenoid valve 2 of the solenoid assembly 10 also comprises an internal relief port (not shown) in fluid communication with the internal actuator port when the solenoid valve is in a de-energized state.

Still referring to FIG. 2, solenoid valve assembly 10 comprises a manifold 4 to which each solenoid valve 2 is affixed. The manifold 4 is internally fluidly connected to each of the internal pressure port, the internal actuator port, and the internal relief port of each solenoid. Manifold 4 comprises external actuator ports 6 (one dedicated to each solenoid valve 2) through which pressurized inert gas will flow to a respective pneumatic valve (not shown) via flexible tubing (not shown).

Manifold 4 also comprises at least one external pressure port 3. External pressure port 3 runs the length of manifold 4 and is in fluid communication (internally) with each internal pressure port of each solenoid valve to supply pressurized inert gas to the solenoid valves 2. Manifold 4 may have more than one external pressure port 3 for serial connection with another solenoid valve assembly. Where no additional serial connections are required, one of the external pressure ports can be fitted with a plug so as to maintain the internal pressure to the solenoid valves. Manifold 4 can be made from any material suitable for the required operating pressure. A typical operating pressure is from about 50 psi to about 100 psi and, preferably, from about 70 psi to about 80 psi. Metal is a preferred material for manifold 4 and aluminum and stainless steel are examples of preferred metals.

Manifold 4 also comprises a dedicated external relief port 8 for each of the plurality of solenoids 2 wherein the external relief port 8 is in fluid communication with the internal relief port of the respective solenoid valve 2. As used herein, the term "dedicated external relief port" means that each solenoid valve 2 has its own relief port in fluid communication with the internal actuator port when the solenoid valve is in a de-energized state as opposed to, for example, that shown in prior art FIG. 1, where an external relief port being in fluid communication with more than one solenoid valve. With this configuration, when one of the solenoid valves 2 is de-energized, a second means to supply a pressurized inert gas can be connected to the external relief port 8 and supply pressure to the respective pneumatic valve operated by that solenoid valve 2, thus by-passing the external pressure port 3 and the need to energize the respective solenoid valve 2.

The second means to supply a pressurized inert gas can be, for example, a pneumatic pressure line connected to, for example, a pressurized cylinder or a house air or $N_2$ line and may be the same as the first means or may be a separate line connected to the same supply cylinder or source of house air or nitrogen. The role of the second means will be described in further detail in the following paragraphs.

Solenoid valve assembly 10 also comprises a controller means (not shown) for electrically energizing and de-energizing each of the plurality of solenoids. The controller means preferably comprises a logic microprocessor and sensors and may be any controller means familiar to those skilled in the art.

Figure 3:
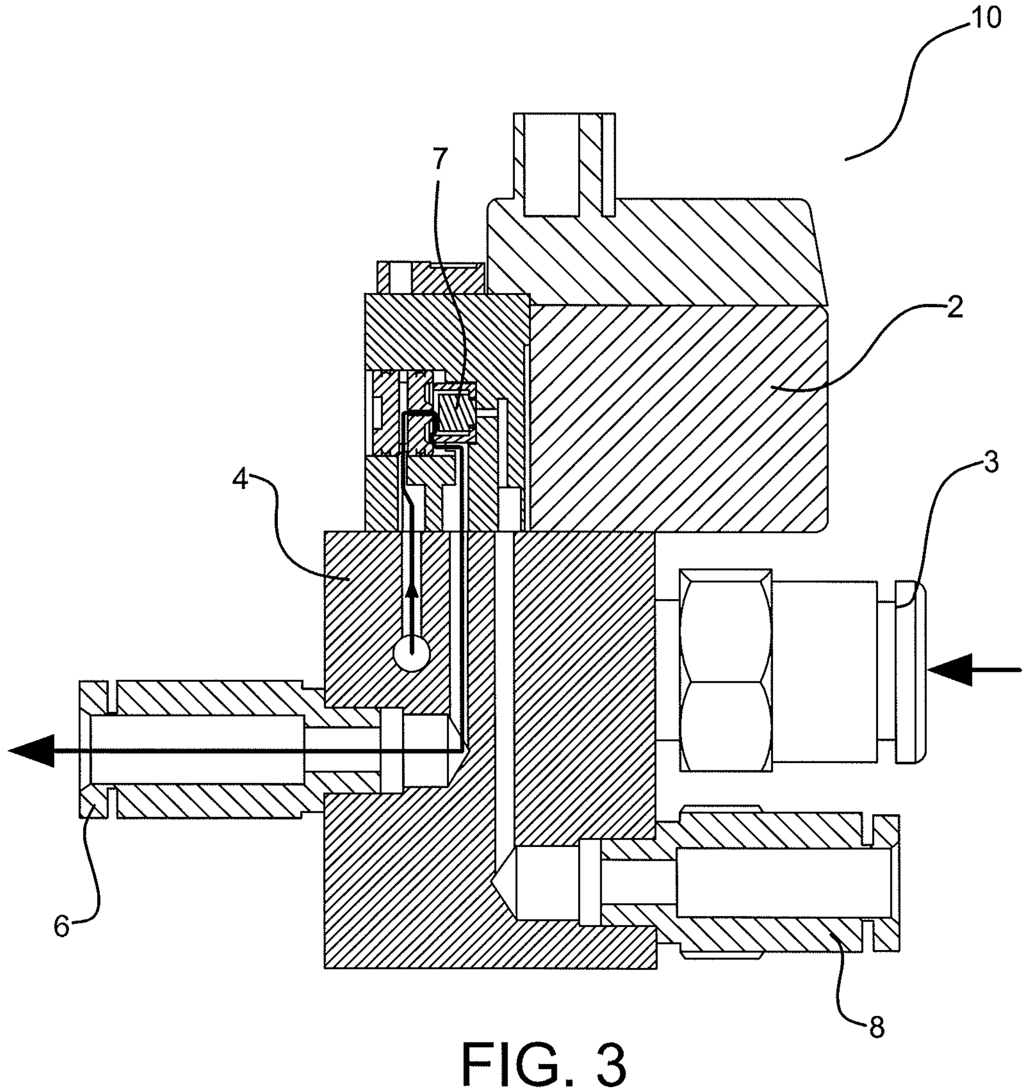
FIG. 3 is a cross-sectional view of the solenoid valve assembly according to the present invention wherein the solenoid valve is in an energized state.
Figure 4:
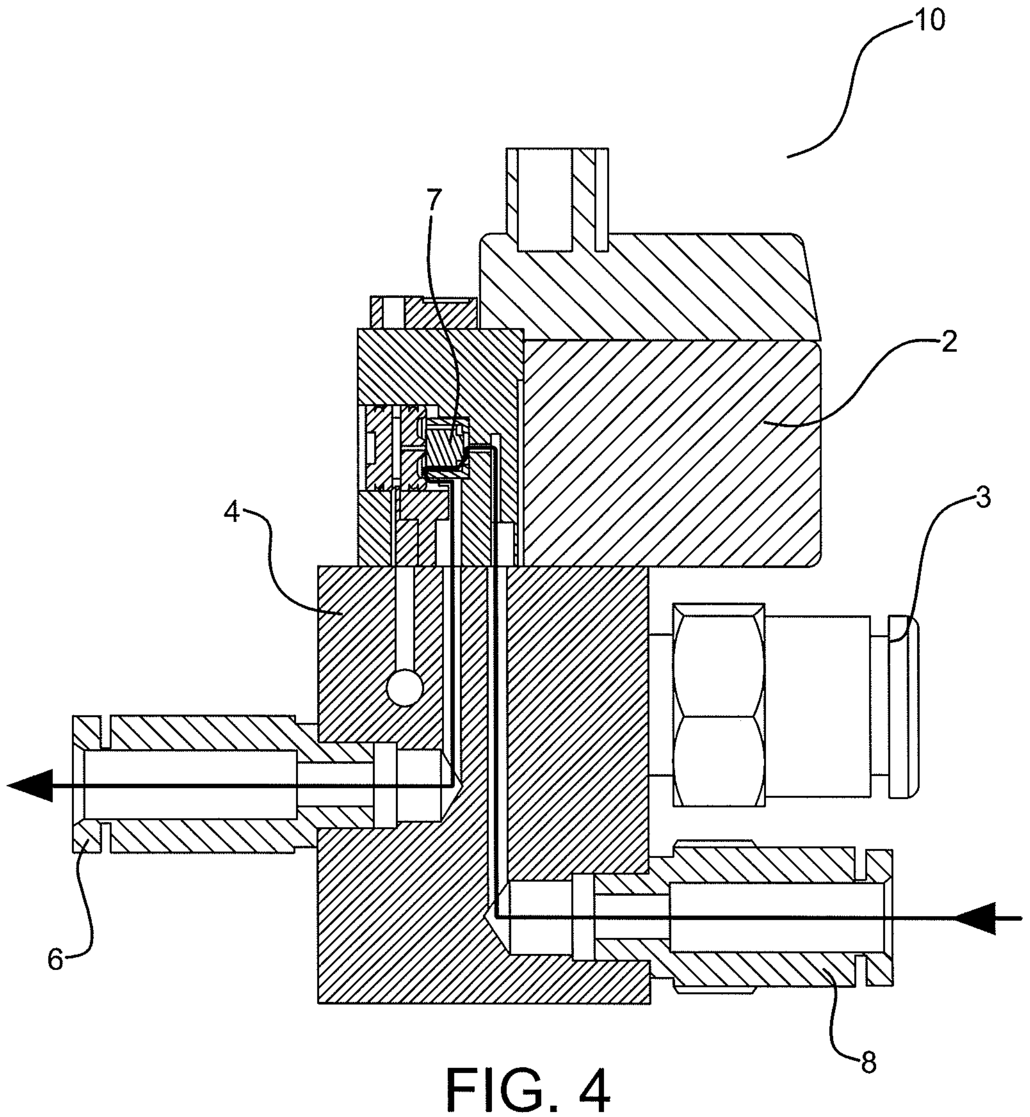
FIG. 4 is the cross-sectional view of the solenoid valve assembly shown in FIG. 3 wherein the solenoid valve is in a de-energized state.

FIGS. 3 and 4 illustrate the operation of the solenoid valve assembly 10 of the present invention. Referring to FIG. 3, a cross-sectional view of the solenoid valve assembly 10 is shown wherein the solenoid valve 2 is in an energized state as instructed by the controller (not shown). Pressurized inert gas such as, for example, air, is introduced into the manifold 4 at external pressure port 3. In an energized state, solenoid valve 2 via valve member 7 permits internal fluid communication between the external pressure port 3 and the external actuator port 6 through which the pressurized air flows to safely operate a respective pneumatic valve (not shown) via flexible tubing (not shown).

FIG. 4 illustrates the solenoid valve assembly of FIG. 3 wherein the solenoid valve 2 is in a de-energized state. Solenoid valve 2, for example, may be the only solenoid valve 2 or one of several in the assembly 10 that is de-energized due to a variety of reasons such as, for example, controller failure or routine maintenance. When gas flow to the pneumatic valve needs to be maintained, a pneumatic pressure line can be connected to solenoid valve 2 (or any other solenoid valves 2 that require the by-pass) via the dedicated external relief port 8. Air pressure, for example, is then supplied to each dedicated external relief port 8, which currently is not in fluid communication with the external actuator port 6 when the solenoid valve 2 is in a energized state as is shown via the arrows in FIG. 3. Once the solenoid has been by-passed, the controller can be powered off or placed in an idle state, the solenoid valve de-energizes instantly causing the air flow to shift from the external pressure port 3 to the dedicated external relief port 8 via pressure on valve member 7. As a result of the operation of the present invention, the pneumatic valves in the delivery path do not experience a loss of pneumatic pressure and continue to allow the flow of gas or gaseous chemical while the controller (and, thus, the particular solenoid valve(s) 2) is powered down to allow for maintenance of the controller or the solenoid valve(s) 2. Thus, the solenoid valve assembly of the present invention permits selective solenoid valve by-passing to ensure continuous operation of the process tools.

Figure 5:
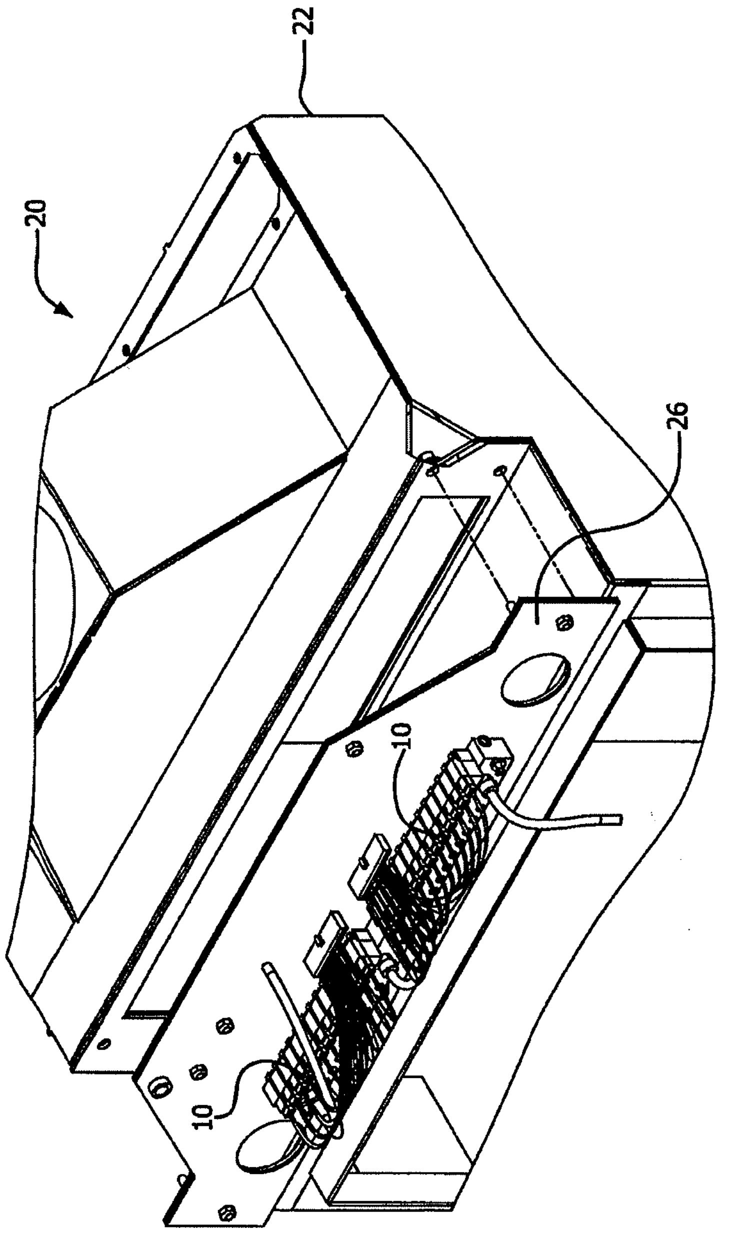
FIG. 5 is a perspective view of the system of the present invention.
Figure 6:
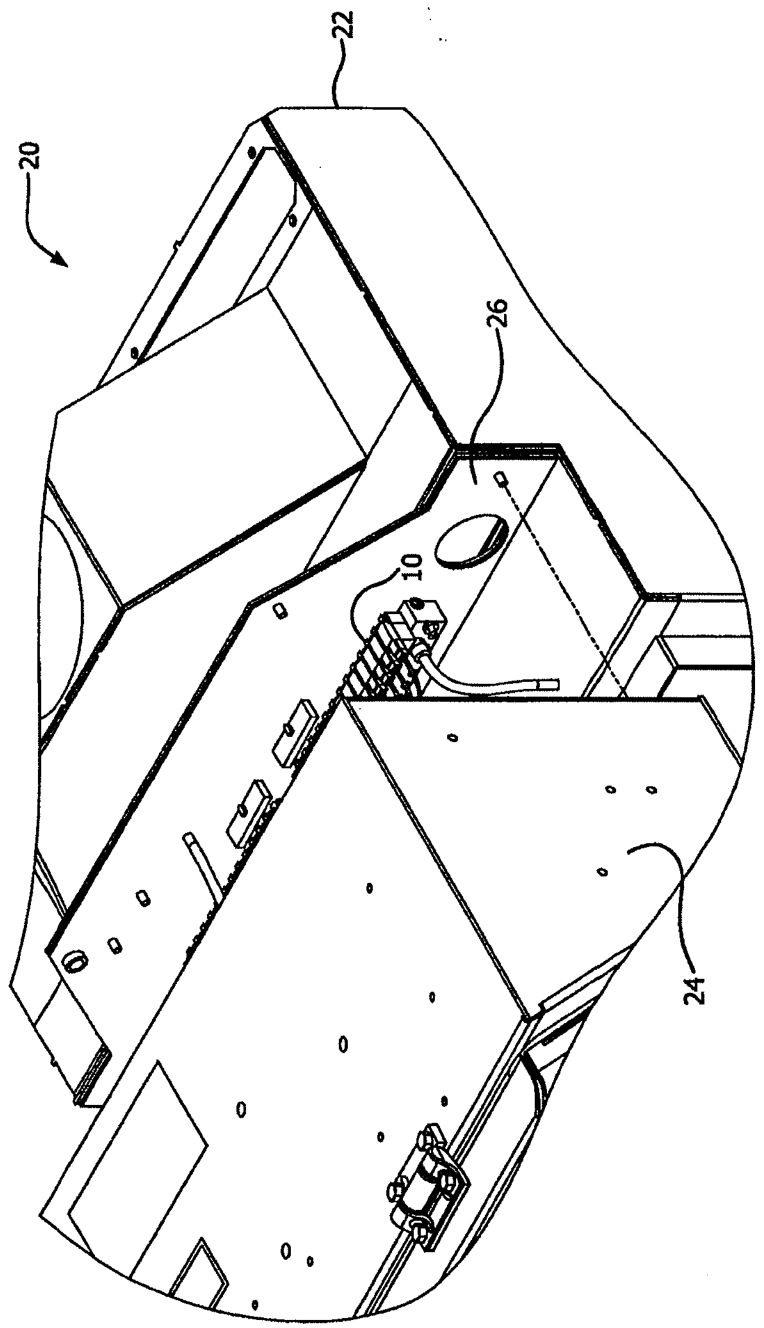
FIG. 6 is another perspective view of the system of the present invention.

In another embodiment of the present invention, a system is provided for operating a plurality of pneumatic valves of a fluid delivery system and capable of supplying an uninterrupted flow of a fluid. Referring to FIGS. 5 and 6, the system 20 comprises a fluid system enclosure 22 capable of housing at least one fluid delivery apparatus (not shown). The function of the fluid system enclosure 22 is to ensure a safe environment for personnel during cylinder changes or in the event of a hazardous gas leak. The fluid system enclosure 22 must be connected to a properly designed exhaust system that is continuously operated in order to provide a safe environment. The fluid system enclosure 22 provides the secondary containment for any leak from the hazardous gas cylinder, cylinder connection and pigtail, and the process panel. The exhaust system continuously removes any leaking hazardous gas from the fluid system enclosure to a safe disposal system.

The fluid system enclosure 22 is preferably constructed of 12 gage (0.004 mm) steel with fully welded seams and protected with corrosion resistant polyurethane paint. The fluid system enclosure 22 is preferably large enough to hold from one to three cylinders. One or more exhaust stacks are typically provided for connection to an exhaust system. Preferably, the fluid system enclosure 22 has 12 gage (0.004 mm) steel doors with windows constructed of ¼" thick (6.4 mm) wire reinforced safety glass. A temperature activated (165° F./74° C.) sprinkler head may also be provided. Preferably, formed brackets are mounted inside of the cabinet to securely hold each cylinder contained therein. An example of a fluid system enclosure for use in accordance with the present invention is the AP11 GASGUARD™ commercially available from Air Products and Chemicals, Inc. (Allentown, Pa.).

The fluid delivery system can comprise canisters or cylinders of harmful process gasses for delivery to a tool. Exemplary gases include process gases employed in the manufacture of microelectronics such as, for example, ammonia, hydrogen chloride, boron trichloride, hydrogen fluoride, boron trifluoride, hydrogen sulfide, chlorine, nitrogen dioxide, chlorine trifluoride, phosphorous pentafluoride, dichlorosilane, silicon tetrachloride, fluorine, silicon tetrafluoride, hydrogen bromide, and tungsten hexafluoride.

Referring to FIG. 6, the system of the present invention further comprises a controller 24. Controller 24 is preferably a microprocessor-based unit housed in a metal enclosure. Controller 24 functions to continuously monitor system inputs and automatically perform purging operations by sequencing valve actuation. Adequate purging is ensured by checking pressure and vacuum at each step within the purge cycles. Controller 24 preferably also has the capability of shutting down the system if an unsafe condition arises. Controller 24 preferably comprises a screen (not shown) that allows the operator to easily understand the operation and to quickly identify operating problems as well as a color scheme showing open and closed valves. Preferably, controller 24 also comprises a shutdown alarm box and/or an emergency shut-off valve (mechanical/pneumatic). Such controllers are also exemplified by the AP11 GASGUARD™ commercially available from Air Products and Chemicals, Inc. (Allentown, Pa.).

Referring again to FIGS. 5 and 6, system 20 of the present invention comprises panel 26 comprising at least one solenoid valve assembly 10 according to the present invention and detailed above. Panel 26 may be made from any suitable material although aluminum or stainless steel are preferred. Panel 26 preferably comprises a gasket around its perimeter to better seal off the electronics inside of controller 24 from the ambient environment in the event that hazardous material becomes uncontained.

Panel 26 is secured to and separable from the controller 24. Panel 26 is also secured to fluid system enclosure 22. Panel 26 may be secured to controller 24 and fluid system enclosure 22 by any means known to those skilled in the art, including screws, bolts, or other fastening means, which will allow for repeated separation and attachment of panel 26 to controller 24 and/or the fluid system enclosure 22. As used herein, the term "separable" as it relates to panel 26 means that panel 26 is able to be separated from the controller 24 such that controller 24 can be removed away from fluid system enclosure 22 without removing the solenoid valve assembly 10 according to the present invention away from the fluid system enclosure 22, which will allow the bypass so the pneumatic valves in the delivery path to not experience a loss of pneumatic pressure and continue to allow the flow of gas or gaseous chemical while the controller (and, thus, the particular solenoid valve(s)) is completely removed for maintenance or replacement with a new controller and associated electronics.

With this configuration, to manually and pneumatically bypass the solenoids, a single pneumatic tube (i.e., the a second means to supply a pressurized inert gas) (not shown) can be fed into the controller via a plugged connection on a solenoid assembly. Pneumatic tees can then be employed on this tube within the controller and connected to the specific solenoids required to enable continuing gas flow. Once connected to the correct solenoids, pressure is applied to the in-coming tube. The controller can now be de-energized which will also de-energize the solenoids. The solenoids which are pneumatically by-passed will remain open. The controller can then be physically removed if necessary, leaving the panel 26 attached to the gas system enclosure 22.

Once controller maintenance is complete or a new controller is installed, the pneumatically by-passed solenoids can be returned to normal controller functionality and the temporary pneumatic tubing removed.

In view of this description of the operation of the solenoid valve assembly 10 of the present invention, the present invention also provides a method for continuously operating a pneumatic valve delivering a fluid to a process tool via a solenoid valve assembly. The method comprises the steps of supplying pressurized inert gas to the at least one external pressure port of the manifold; energizing at least one of the solenoid valves to allow the pressurized inert gas to flow through the internal pressure port of the at least one solenoid valve out through the external actuator port of the at least one solenoid valve to the respective pneumatic valve; connecting a second means to supply a pressurized inert gas to at least one of the dedicated external relief ports of the manifold; supplying the pressurized inert gas to the at least one of the dedicated external relief ports of the manifold; de-energizing the at least one energized solenoid valves to which the second means to supply a pressurized inert gas is connected via the dedicated external relief port; and supplying pressurized inert gas to the respective pneumatic valve operated by the de-energized solenoid valve from the dedicated external relief outlet through the external actuator port.

The foregoing description is intended primarily for purposes of illustration. Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

The invention claimed is:

1. A solenoid assembly for operating a plurality of pneumatic valves of a fluid delivery system and capable of supplying an uninterrupted flow of a fluid, the assembly comprising:

- a plurality of solenoid valves, wherein each solenoid valve is capable of being in an energized state and a de-energized state, each solenoid valve comprising:
  - an internal pressure port in fluid communication with a first means to supply a pressurized inert gas;
  - an internal actuator port in fluid communication with a respective pneumatic valve and with the internal pressure port when the solenoid valve is in an energized state; and
  - an internal relief port in fluid communication with the internal actuator port when the solenoid valve is in a de-energized state; and
- a manifold upon which the plurality of solenoid valves is affixed, wherein the manifold is internally fluidly connected to each of the internal pressure port, the internal actuator port, and the internal relief port of each solenoid valve, and wherein the manifold comprises:
  - an external pressure port in fluid communication with each internal pressure port of each solenoid valve; and
  - a dedicated external relief port for each of the plurality of solenoid valves, wherein the dedicated external relief port is in fluid communication with the internal relief port of the respective solenoid valve such that, when one of the solenoid valves is de-energized, a second means to supply a pressurized inert gas can be connected to the external relief port and supply pressure to the respective pneumatic valve operated by that solenoid valve.

2. The solenoid assembly of claim 1 further comprising flexible tubing connecting the external actuator port of each solenoid to a respective pneumatic valve.

3. The solenoid assembly of claim 1 wherein the pressurized inert gas is air.

4. The solenoid assembly of claim 1 wherein the pressurized inert gas is nitrogen.

5. The solenoid assembly of claim 1 wherein the manifold comprises aluminum.

6. The solenoid assembly of claim 1 wherein the manifold comprises stainless steel.

7. A system for operating a plurality of pneumatic valves of a fluid delivery system and capable of supplying an uninterrupted flow of a fluid, the system comprising:

a fluid system enclosure capable of housing at least one fluid delivery apparatus;

a controller secured to but removable from the fluid system enclosure;

a panel secured to and separable from the controller, the panel comprising:

a plurality of solenoid valves, wherein each solenoid valve is capable of being in an energized state and a de-energized state, each solenoid valve comprising:

an internal pressure port in fluid communication with a first means to supply a pressurized inert gas;

an internal actuator port in fluid communication with a respective pneumatic valve and with the internal pressure port when the solenoid valve is in an energized state; and an internal relief port in fluid communication with the internal actuator port when the solenoid valve is in a de-energized state; and a manifold upon which the plurality of solenoid valves is affixed, wherein the manifold is internally fluidly connected to each of the internal pressure port, the internal actuator port, and the internal relief port of each solenoid valve, and wherein the manifold comprises:

an external pressure port in fluid communication with each internal pressure port of each solenoid valve; and a dedicated external relief port for each of the plurality of solenoid valves, wherein the dedicated external relief port is in fluid communication with the internal relief port of the respective solenoid valve such that, when one of the solenoid valves is de-energized, a second means to supply a pressurized inert gas can be connected to the external relief port and supply pressure to the respective pneumatic valve operated by that solenoid valve, wherein the controller is capable of being removed away from the fluid system enclosure separate from the panel such that the panel remains on the fluid system.

8. The system of claim 7 wherein the solenoid assembly further comprises flexible tubing connecting the external actuator port of each solenoid to a respective pneumatic valve.

9. The system of claim 7 wherein the pressurized inert gas is air.

10. The system of claim 7 wherein the pressurized inert gas is nitrogen.

11. The system of claim 7 wherein the manifold comprises aluminum.

12. The system of claim 7 wherein the manifold comprises stainless steel.

13. The system of claim 7 wherein the panel comprises a steel plate and a gasket.

14. The system of claim 7 wherein the controller comprises a mechanical pneumatic shut-off valve.

* * * * *